2,227,650

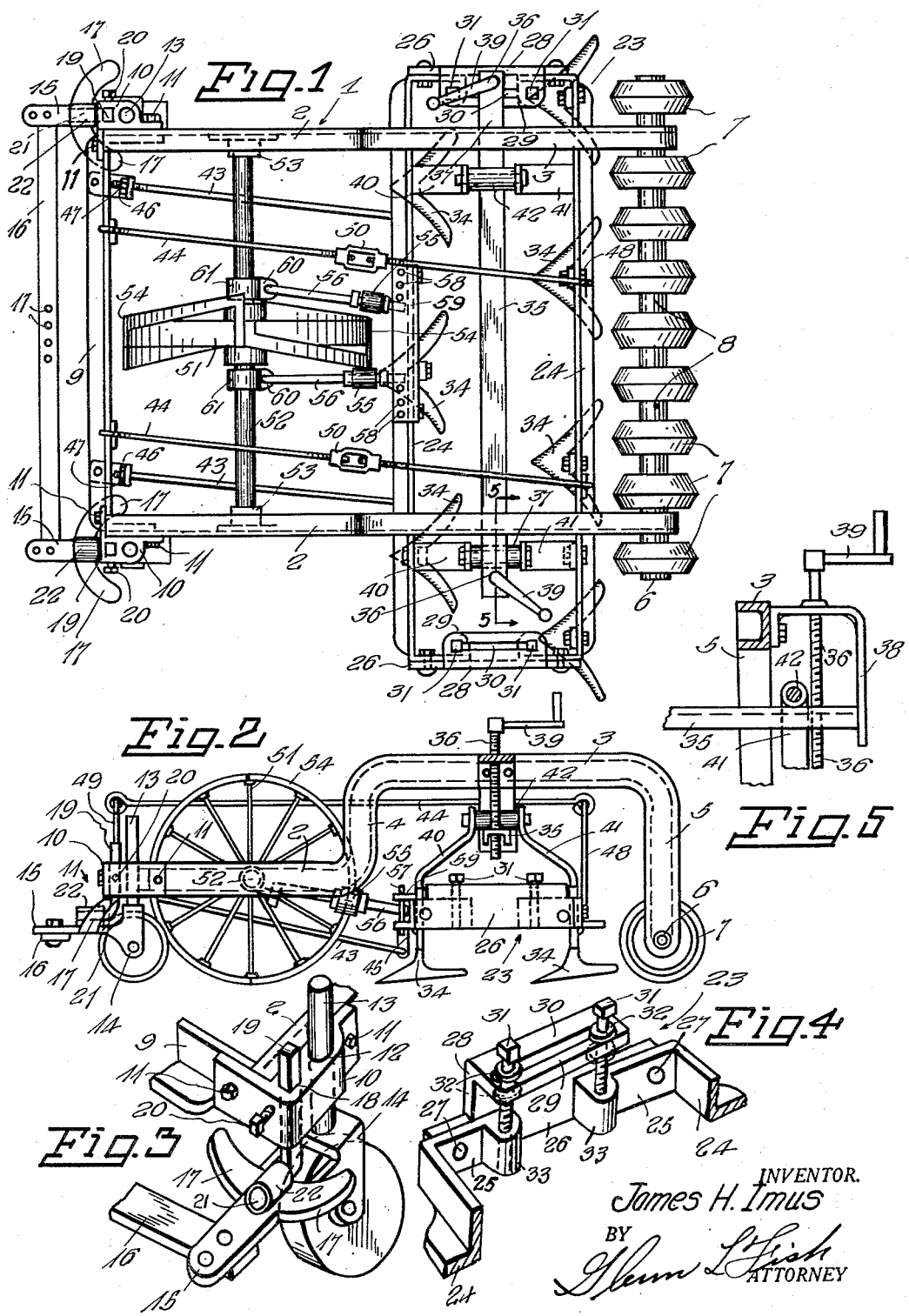
Jan. 7, 1941. J. H. IMUS 2,227,650
WEEDER
Filed Nov. 28, 1939
INVENTOR.
James H. Imus Patented Jan. 7, 1941

UNITED STATES PATENT OFFICE 2,227,650

WEEDER

James H. Imus, Grand Coulee, Wash.

Application November 28, 1939, Serial No. 306,547

11 Claims. (Cl. 97—44)

This invention relates to a weeder of the type adapted to be drawn across a field by a tractor or other draft means and it is one object of the invention to provide a weeder wherein the weeding blades are suspended from a blade-carrying frame or auxiliary frame suspended from a main frame and so mounted that it may have reciprocating movement transversely of the main frame as the weeder is drawn across a field.

Another object of the invention is to provide a weeder wherein reciprocating movement is imparted to the auxiliary frame from a bull wheel rotatably mounted on a shaft carried by the main frame in such position that it is rotated by engagement with the ground during forward movement of the weeder, the bull wheel being of such construction that as it turns it will serve as means for reciprocating the blade carrying frame.

Another object of the invention is to provide the main frame with rear wheels of such construction that they serve to resist side draft during forward movement of the weeder, the front wheels of the weeder being of the castor type and having arms provided with cam members for shifting the main frame upwardly and supporting the bull wheel out of engagement with the ground during turning of the weeder at an end of a field.

Another object of the invention is to provide a weeder having the auxiliary blade-carrying frame not only mounted for reciprocating movement transversely of the main frame but also so mounted that it can be vertically adjusted and thus dispose the blades in position to enter the ground a predetermined depth.

Another object of the invention is to so form the blades that as the weeder moves forwardly and the auxiliary frame reciprocates transversely, a very good shearing action will take place and weeds will be easily cut.

The invention is illustrated in the accompanying drawing, wherein:

Fig. 1 is a top plan view of the improved weeder.

Fig. 2 is a side elevation thereof.

Fig. 3 is a fragmentary perspective view of one of the front castors and its mounting and steering means.

Fig. 4 is a perspective view of one end portion of the auxiliary blade-carrying frame.

Fig. 5 is a fragmentary sectional view taken along the line 5—5 of Fig. 1.

The main frame 1 of this improved weeder has side bars 2 formed of strong channel metal, as shown in Fig. 5, and bent intermediate their ends to provide upwardly offset rear portions or yokes 3 having front and rear arms 4 and 5. The rear arms 5 are of greater length than the front arms 4 and, at their lower ends, carry a shaft 6 on which are mounted a number of wheels 7. These wheels are held in spaced relation to each other by spacing sleeves 8 and have rim portions which are substantially V-shaped in cross section so that they have a tendency to embed themselves in the ground a short distance and serve very effectively to prevent side drift during forward movement of the weeder.

Front ends of the side bars are connected by a cross bar 9 formed of angle metal and, at each forward corner of the frame, is mounted a casting or bracket 10 secured by bolts 11 and formed with vertical bores 12 through which pass the stems 13 of castors 14. Arms 15 extend forwardly from the castors and are connected by a draft bar 16 having its intermediate portion formed with a plurality of openings 17 through a selected one of which the draft appliance of a tractor may be passed to hitch the weeder back of the tractor. Each lever arm 15 carries transversely extending wings 17 located directly opposite each other and forming a cam member which is curved horizontally, as shown in Fig. 1, and also vertically, as shown in Fig. 2. Each casting or bracket is also formed with a bore 18 which is rectangular in cross section and through which passes squared shaft 19 held in vertically adjusted position by a set screw 20 and having its lower portion bent to form a forwardly projecting arm 21. Rollers 22 are rotatably carried by the arms 21 and rest on the arms 15 at the cam members 17. Normally, the castors are in position to guide the weeder straight ahead with the forward portions of the side bars 2 extending horizontally, as shown in Fig. 2, but when the draft bar 16 is shifted transversely of the frame to turn the castors and impart turning movement to the weeder at an end of a field, the rollers 22 will move along the cam members 17 toward the inner or outer ends thereof, according to which direction the weeder is turned, and the forward portion of the main frame will be shifted upwardly about the shaft 6 as a pivot during the turning movement and return to its lowered or normal position after the weeder has been turned and started back across the field.

In combination with the main frame there has been provided an auxiliary blade-carrying frame 23 having front and rear bars 24 which are formed of angle metal and have their end portions bent to form arms 25 pivotally secured to end bars 26 by bolts 27. The intermediate portion 28 of each end bar extends upwardly and is formed with an inwardly extending flange 29 having a slot 30 through which pass suspending screws 31. These screws are provided with collars 32 to prevent them from shifting vertically through the slots and lower ends of the screws are engaged in internally threaded sockets 33 extending inwardly at ends of the arms 25 of the bars 24. By turning the screws, the arms 25 will be tilted about the pivots 27 and the bars 24 angularly adjusted and consequently, the blades or shovels 34 suspended from the bars 24 of the auxiliary frame will be angularly adjusted and maintained in predetermined angular relation to the ground over which the weeder moves.

The auxiliary frame is to be suspended under the yokes or rear portions 3 of the side bars 2 of the main frame 1 and, in order to do this there has been provided a mounting bar 35 which extends transversely of the main frame and adjacent its ends is formed with threaded openings to receive the suspending screws or hangers 36 which are mounted through brackets 37. The brackets 37 have their outer portions bent downwardly to form abutment arms 38 for engaging the ends of the mounting bar, and from an inspection of Figs. 2 and 5, it will be readily seen that when the screws are turned through the medium of their handles 39, the mounting bar will be shifted vertically to adjusted positions. As a suspending screw is provided at each side of the main frame for engaging opposite ends of the bar 35, the bar may be angularly adjusted and maintained in proper angular relation to the ground over which the weeder is moved. Front and rear straps 40 and 41 extend upwardly from the front and rear bars of the auxiliary frame in converging relation to each other and between their upper ends are mounted rollers 42 which rest upon the bar 35. The auxiliary frame will, therefore, be so suspended from the bar 35 that it may have reciprocating movement transversely of the main frame during operation of the weeder. The blades or shovels are of substantially V-shaped formation when viewed in top plan and since they move forwardly and at the same time have reciprocating movement transversely of the main frame, a very good slicing or shearing action will take place and weeds encountered by them will be cut off in a very effective manner. The cutting edges of the blades or shovels are beaded upon their upper faces and since their under faces have contact with the ground during operation of the weeder they will be kept very sharp.

In order to guide reciprocating movement of the auxiliary frame, there have been provided rods 43 and 44 which extend longitudinally of the main frame. Rods 43 have their rear ends pivoted to brackets 45 depending from the front bar 24 of the auxiliary frame and their front ends passed through brackets 46 pivoted to the front bar 9 of the main frame, nuts 47 being applied to tighten the rods. The rods 44 have their rear ends formed with eyes loosely engaging upper ends of standards 48 rising from the rear bar 24 of the auxiliary frame and their front ends formed with similar eyes loosely engaging upper ends of standards 49 rising from the front cross bar 9 of the main frame. A turnbuckle 50 is provided intermediate the length of each rod 44 to tighten the same. The two sets of rods 43 and 44 maintain the auxiliary frame parallel to the cross bar 9 of the main frame and cause it to move in a straight path transversely of the main frame as it reciprocates along the bar 35.

Reciprocating movement is imparted to the auxiliary frame by means of a bull wheel 51 loosely mounted on a shaft 52 for rotary motion thereon. The shaft extends transversely of the main frame and at its ends is mounted in bearing sockets 53 carried by forward portions of the side bars 2 of the main frame. The rim of the wheel 51 is formed of circumferentially extending sections 54 constituting cams having sloping side edges for engaging rollers 55 carried by arms 56. These arms extend longitudinally of the main frame and have their rear ends engaged with pins 57 mounted in selected ones of openings 58 in a bracket 59 carried by the front bar 24 of the auxiliary frame. At their front ends the arms or bars 56 are pivotally engaged with ears 60 projecting rearwardly from collars 61 tightly mounted about the shaft 52 at opposite sides of the bull wheel. From an inspection of Fig. 1, it will be readily seen that when the bull wheel is turned by contact with the ground during forward movement of the weeder, the cam sections forming the rim of the bull wheel will act upon the rollers and reciprocating movement will be imparted to the auxiliary frame and the blades or shovels shifted back and forth transversely of the main frame. When a turn is made and the cam members 17 cause the main frame to be tilted upwardly at its front end, the bull wheel will be shifted upwardly out of engagement with the ground and reciprocating movement not imparted to the auxiliary frame. The blades or shovels will also be shifted upwardly at this time and lowered with the bull wheel when the weeder has been turned and is again drawn across the field straight ahead.

Having thus described the invention, what is claimed is:

1. In a weeder, a main frame, wheels mounting the frame for vertical tilting from lowered operative position to raised position, castors pivotally mounted and constituting guiding wheels for the frame, cam members carried by said castors, members carried by said frame and engaging said cam members to shift the frame upwardly to raised position when the castors are turned transversely of the frame, an auxiliary blade-carrying frame mounted for reciprocating movement transversely of the main frame, and means for imparting reciprocating motion to the auxiliary frame including a power wheel movable vertically with the main frame into and out of position for engagement with the ground.

2. In a weeder, a main frame, castors at one end of said main frame having stems rotatably and slidably mounted to permit turning of the weeder and vertical tilting of the main frame from a lowered operative position to raised position, companion members carried by the frame and castors for shifting the said end of the frame upwardly to raised position during pivoting of the castors to turn the weeder, a blade carrier carried by said main frame and mounted for shifting movement, and means for imparting shifting movement to said blade carrier including a power wheel movable vertically with the main frame into and out of driving contact with the ground.

3. In a weeder, a main frame, castors at the front of said main frame having stems rotatably and slidably mounted to permit turning of the weeder and vertical tilting of the main frame from lowered position to raised position, arms extending forwardly from said castors, a draft bar extending between and pivoted at its ends to said arms, transversely extending cam members carried by said arms and curved rearwardly and vertically from the arms toward their ends, mounting members carried by said frame and vertically adjustable, rollers carried by said mounting members and resting on said cam members for shifting the front end of the frame upwardly and tilting the frame vertically when the castors are moved pivotally to turn the weeder, a blade carrier mounted under the main frame for reciprocating movement transversely of the main frame, and means for imparting reciprocating movement to the blade carrier including a power wheel rotatably carried by the main frame and movable therewith into and out of position for driving contact with the ground.

4. In a weeder, a main frame, rear wheels for the main frame, front wheels for the main frame, companion members carried by the main frame and the front wheels for shifting the front end of the main frame upwardly and tilting the main frame vertically about the rear wheels from lowered position to raised position, an auxiliary frame under the main frame, blades carried by said auxiliary frame, rods extending longitudinally of the main frame with their front ends pivoted to forward portions thereof and their rear ends pivoted to the auxiliary frame and serving to guide reciprocating movement of the auxiliary frame, a drive wheel rotatably mounted intermediate the width of the main frame forwardly of the auxiliary frame and having cam members extending circumferentially of the wheel, arms extending longitudinally of the main frame with their rear ends pivoted to the auxiliary frame and their front ends pivotally mounted at opposite sides of the drive wheel, and rollers carried by said arms for engaging the cam members and swinging the arms transversely to impart reciprocating movement to the auxiliary frame during turning of the drive wheel.

5. In a weeder, a main frame having side bars, the side bars being bent to form upwardly offset yokes, a rear axle carried by rear arms of said yokes, wheels carried by said axle, a front cross bar extending between front ends of the side bars, bearing brackets at front corners of said frame secured to the side bars and the front cross bar, castors having stems rotatably and slidably mounted through the bearing brackets, arms extending forwardly from said castors, a draft bar extending between and pivoted to said arms, cam members extending transversely of said arms from opposite sides thereof and curved vertically and rearwardly toward their outer ends, bars adjustable vertically through said bearing brackets and having horizontal rollers at their lower ends resting on said cam members for shifting the front end of the frame upwardly and tilting the frame vertically about the rear axle when the castors are moved pivotally to turn the weeder, a blade carried under said yokes mounted for reciprocating movement transversely of the main frame, and means for imparting reciprocating movement to said blade including a power wheel rotatably mounted between the side bars forwardly of the blade and movable with the main frame out of driving engagement with the ground when the castors are turned in the bearing brackets and the main frame tilted upwardly.

6. In a weeder, a main frame having side bars, front and rear wheels for said frame, means for tilting said main frame upwardly at its front end to raised position when turning the weeder, an auxiliary frame, a supporting bar suspended from the side bars and mounting the auxiliary frame for reciprocating movement transversely of the main frame, and means for imparting reciprocating movement to the auxiliary frame including a drive wheel rotatably mounted in advance of the auxiliary frame and shiftable upwardly out of engagement with the ground when the main frame is tilted upwardly.

7. In a weeder, a main frame having side bars, front and rear wheels for the main frame, the side bars having portions bent to form upwardly offset yokes, a supporting bar extending transversely of the main frame under said yokes, means for vertically adjusting the bar and suspending the bar in set position, an auxiliary frame suspended under said supporting bar for reciprocating movement thereon transversely of the main frame, blades carried by said auxiliary frame, and means for imparting reciprocating movement to the auxiliary frame including a driving wheel rotatably mounted between the side bars in advance of the auxiliary frame and the yokes.

8. In a weeder, a main frame having side bars, front and rear wheels for the main frame, the side bars having portions bent to form upwardly offset yokes, a supporting bar extending transversely of the main frame under said yokes, means for vertically adjusting said bar and suspending the bar in set position, an auxiliary frame under said supporting bar, arms extending upwardly from front and rear portions of said auxiliary frame, rollers carried by said arms and resting on said supporting bar to mount the auxiliary frame for reciprocating movement along the bar transversely of the main frame, and means for imparting reciprocating movement to the auxiliary frame including a driving wheel rotatably mounted between the side bars in advance of the auxiliary frame and the yokes.

9. In a weeder, a main frame having side bars, front and rear wheels for the main frame, the side bars having portions bent to form upwardly offset yokes, a supporting bar extending transversely of the main frame under said yokes, brackets extending outwardly from said yokes and having depending portions engaging ends of said supporting bar, screws carried by said brackets and threaded through said supporting bar for vertically adjusting the bar and supporting the bar in set position, an auxiliary frame under said supporting bar having upstanding hangers provided with rollers resting on the supporting bar and mounting the auxiliary frame for reciprocating movement along the bar transversely of the main frame, and means for imparting reciprocating movement to the auxiliary frame including a drive wheel rotatably mounted between side bars of the main frame in advance of the yokes.

10. In a weeder, a main frame having side bars, front and rear wheels for the main frame, the side bars having portions bent to form upwardly offset yokes, a supporting bar extending transversely of the main frame under said yokes, means for vertically adjusting said bar and suspending the bar in set position, an auxiliary frame under said supporting bar having end bars and front and rear bars formed with arms at their ends pivoted to the end bars, upstanding bracket members carried by the end bars, screws rotatably carried by the bracket members and threaded into sockets carried by said arms for tilting the front and rear bars to angularly adjusted positions, blades carried by the front and rear bars, hangers rising from the front and rear bars and having rollers at their upper ends resting on said supporting bar to mount the auxiliary frame for reciprocating movement thereon transversely of the main frame, and means for imparting reciprocating movement to the auxiliary frame including a drive wheel rotatably mounted between the side bars of the main frame in advance of said yokes.

11. In a weeder, a main frame having side bars, front and rear wheels for the main frame, the side bars having portions bent to form upwardly offset yokes, a supporting bar extending transversely of the main frame under said yokes, means for vertically adjusting said bar and suspending the bar in set position, an auxiliary frame suspended under said supporting bar for reciprocating movement thereon transversely of the main frame, arms extending upwardly from front and rear portions of said auxiliary frame, rollers carried by said arms and resting on said supporting bar to mount the auxiliary frame for reciprocating movement along the bar transversely of the main frame, rods pivoted at their front ends to the forward portion of said main frame in transversely spaced relation to each other and extending longitudinally of the main frame parallel to each other with their rear ends pivoted to the auxiliary frame, a shaft mounted between forward portions of the side bars of the main frame, a driving wheel rotatably carried by said shaft and having a ground engaging rim formed of circumferentially extending sections constituting arcuate cam members, collars carried by said shaft at opposite sides of said driving wheel, arms at opposite sides of said driving wheel pivoted at their front ends to said collars and at their rear ends to the forward portions of the auxiliary frame, and rollers carried by said arms for engaging opposite edge portions of the cam members of the driving wheel and shifting the arms transversely to impart reciprocating movement to the auxiliary frame along the supporting bar transversely of the main frame during turning of the driving wheel.

JAMES H. IMUS.